C. O. HENDERSON.
RUBBER VEHICLE TIRE.
APPLICATION FILED SEPT. 21, 1908.

918,550.

Patented Apr. 20, 1909.

Chester O. Henderson,
Inventor

Witnesses
M. Subler
C. M. Theobald

By
his Attorney

UNITED STATES PATENT OFFICE.

CHESTER O. HENDERSON, OF DAYTON, OHIO, ASSIGNOR OF ONE-THIRD TO WILLIAM A. PICKENS, OF INDIANAPOLIS, INDIANA.

RUBBER VEHICLE-TIRE.

No. 918,550.　　　　　Specification of Letters Patent.　　　Patented April 20, 1909.

Application filed September 21, 1908. Serial No. 454,072.

*To all whom it may concern:*

Be it known that I, CHESTER O. HENDERSON, a citizen of the United States, residing at Dayton, in the county of Montgomery and State of Ohio, have invented certain new and useful Improvements in Rubber Vehicle-Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in rubber tires for vehicle wheels.

The object of the invention is to provide a rubber tire having the requisite elasticity and cushion quality without the use of air.
The formation of the tire is such as to prevent crushing or breaking down of the tire when in use. Everything pertaining to the interior construction of the tire is made as nearly as possible on a radius or circle, thus giving a gradual decrease of strength from the strongest point and preventing any abrupt change in strength at any one point.

My invention consists of a rubber tire having arranged throughout its length a series of uniform cells which are closed to the atmosphere and by means of which the desired resiliency is obtained, without impairing the strength.

Figure 1:
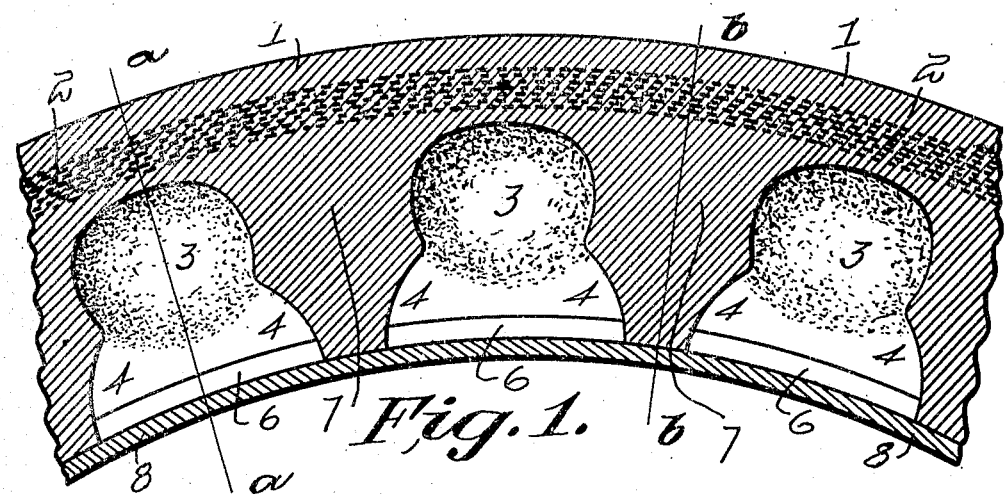
Figures 2, 3:
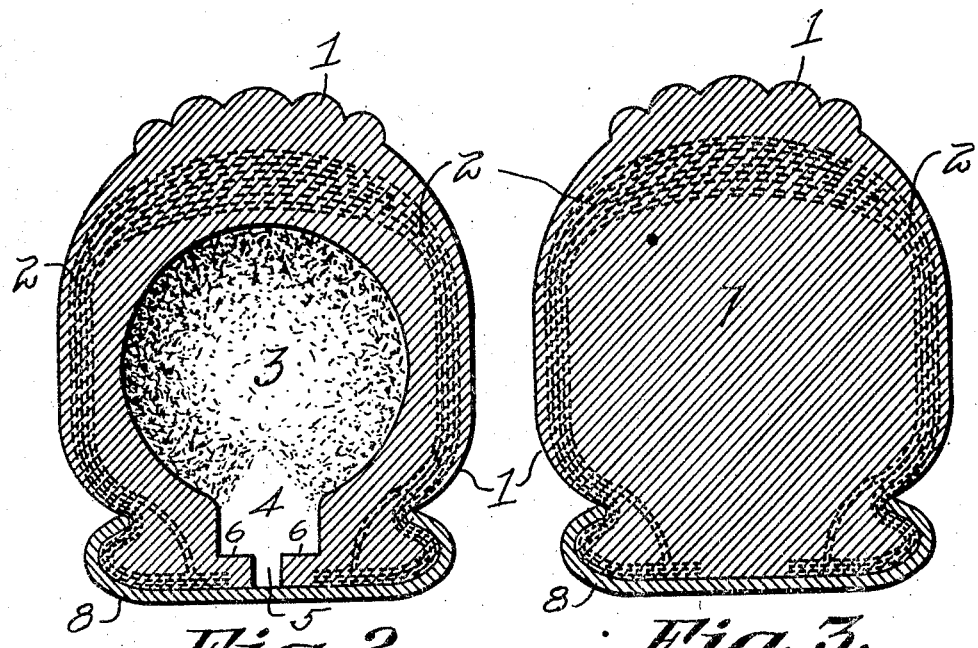

Referring now to the accompanying drawings, Figure 1, is a longitudinal mid-sectional elevation of a portion of the tire and the wheel rim. Fig. 2, is a cross section through one of the cells on the line *a a* of Fig. 1. The stipple work shown in the cells in Figs. 1 and 2, is intended to represent surface shading. Fig. 3, is a cross section through one of the pillars or solid portions of the tire.

In a detail description of the invention, similar reference characters indicate corresponding parts.

In carrying my invention into effect and according to the illustrations hereto annexed, the tire 1 is constructed of rubber reinforced by a web 2 of suitable textile fabric which is increased in layers in the portion of the tire nearer the tread surface. This web or fabric is a common feature in rubber tires and its purpose is to prevent stretching of the tire beyond the desired degree of resiliency, and to otherwise reinforce and strengthen the tire. Arranged in the tire throughout its circular length is a series of cells 3 which are oblong in side elevation and extend inwardly to provide elongated but narrower areas as at 4, and through the inner surface of the tire as at 5. The bottom of these cells is reduced in area by the inwardly-extended flanges 6 and the purpose of the openings 5 through the inner surface of the tire, is to provide facilities for removing the form by means of which the cells are made. The purpose of narrowing the openings 5, is to avoid removing any more of the rubber at the circumferential base of the tire than is necessary, and to thereby maintain a sufficient compression strength to hold the clencher tire and prevent its detachment while the wheel is in use.

The cells are separated by pillars 7 or solid portions of the tire so that there is no communication between said cells, nor is there any communication between the cells and the atmosphere, as it will be seen the clencher rim 8 effectually closes the entrances 5. The reduction of the cross areas of the cells as at 4, has a two-fold advantage, to-wit: It maintains a desirable strength at the circumferential base of the tire and it gives desired resiliency. The pillars 7 or intervening solid portions of the tire, with the rest of the tire, are formed of vulcanized rubber and the said pillars are constructed so as to carry their proportionate part of the load. The cells so interposed between the pillars absorb the shock and give the required resiliency to the tire throughout. The tire is attached to the metallic or clencher rim 8 of the wheel in a well-known manner and as illustrated in the drawings, the attachment being by clencher rim overlapping the circumferential inner edges of the tire and snugly embracing the inner surface of the tire and thus closing the entrance space 5 from the atmosphere. It will therefore be seen, that the cells are entirely closed to the admission of air as it is not desired to make use of these cells for the purpose of receiving air. The tire has a solid base on each side of the cells which prevents the outside of the tire from yielding too much. The outer walls of the cells, it will be observed lie inwardly a suitable distance from the tread surface of the tire and from the reinforcing web, and there is likewise a substantial thickness given the intervening portions or pillars 7 which lie between the cells so that the possibility of the collapsing of any portion of the tire due to too much yielding, is entirely obviated, while the desired amount of resiliency and durability is obtained.

Having described my invention, and the manner of its use and construction, what I claim is:—

1. A tire for vehicle wheels, constructed of rubber reinforced with webbing and having a series of cells arranged therein which are non-communicating, each of said cells having a narrow opening through the circumferential base of the tire, in combination with a rim which embraces the inner circumference of the tire and closes the narrow openings in the circumferential base of the tire, thereby excluding any admission of air to said cells.

2. In a tire for vehicle wheels, the combination with a wheel rim, of a hard rubber tire having a series of cells arranged therein and lying inwardly a suitable extent from the tread surface of the tire, said cells being enlarged lengthwise but made narrower at their inner portions and terminating in still narrower openings through the inner surface of the tire, and pillars or solid portions of the tire interposed between the cells, the inner surfaces of said pillars or solid portions of the tire being engaged by the wheel rim which closes the narrow openings in the tire which extend through the inner surface of said tire.

3. A rubber tire for vehicle wheels, consisting of a hard rubber body provided with a plurality of cells which lie inwardly a substantial distance from the tread surface of the tire and are separated from each other by solid portions of the tire of a substantial thickness, said solid portions being of less width at their base due to the elongation of the inner terminals of the cells, the cells being enlarged in length, but of less width near the inner surface of the tire and terminating in openings of reduced area which extend through the inner surface of the tire, the base portions of said tire on each side of said openings being increased in width, and a clencher rim embracing said base and closing the openings extending through the inner surface of the tire, and whereby said cells are entirely closed from the atmosphere.

4. The combination with a clencher rim, of a solid rubber tire having a series of oblong cells arranged therein with intervening pillars or solid portions of the rubber separating said cells, the solid portions being of less width at their base, and the said cells extending through the inner surface of the tire in narrow openings which are closed by the clencher rim, and whereby the cells are sealed from the atmosphere.

In testimony whereof I affix my signature, in presence of two witnesses.

CHESTER O. HENDERSON.

Witnesses:
MATTHEW SIEBLER,
CAROLYN M. THEOBALD.